(12) United States Patent
Graf et al.

(10) Patent No.: US 8,844,024 B1
(45) Date of Patent: Sep. 23, 2014

(54) SYSTEMS AND METHODS FOR USING TIERED SIGNING CERTIFICATES TO MANAGE THE BEHAVIOR OF EXECUTABLES

(75) Inventors: Nicholas Graf, Culver City, CA (US); Spencer Smith, El Segundo, CA (US); Adam Glick, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1343 days.

(21) Appl. No.: 12/408,950

(22) Filed: Mar. 23, 2009

(51) Int. Cl.
*G06F 21/00* (2013.01)
*G06F 21/44* (2013.01)

(52) U.S. Cl.
CPC ..................... *G06F 21/44* (2013.01)
USPC ......... 726/19; 726/2; 726/16; 726/17; 726/18

(58) Field of Classification Search
CPC ....................................................... G06F 21/44
USPC ...................... 726/19, 2, 16, 17, 18
See application file for complete search history.

(56) References Cited

U.S. PATENT DOCUMENTS

| | | | | |
|---|---|---|---|---|
| 6,694,434 | B1 * | 2/2004 | McGee et al. | 713/189 |
| 7,552,321 | B2 * | 6/2009 | Rockwood et al. | 713/155 |
| 7,565,529 | B2 * | 7/2009 | Beck et al. | 713/156 |
| 2002/0138735 | A1 * | 9/2002 | Felt et al. | 713/176 |
| 2002/0138738 | A1 * | 9/2002 | Sames et al. | 713/185 |
| 2003/0065921 | A1 * | 4/2003 | Chang | 713/175 |
| 2003/0120610 | A1 * | 6/2003 | Hamber | 705/67 |
| 2003/0131232 | A1 * | 7/2003 | Fraser et al. | 713/156 |
| 2004/0064415 | A1 * | 4/2004 | Abdallah et al. | 705/50 |
| 2004/0162984 | A1 * | 8/2004 | Freeman et al. | 713/175 |
| 2005/0095571 | A1 * | 5/2005 | Miller | 434/350 |
| 2005/0114650 | A1 * | 5/2005 | Rockwood et al. | 713/155 |
| 2005/0289085 | A1 * | 12/2005 | Hamber | 705/67 |
| 2006/0015749 | A1 * | 1/2006 | Mittal | 713/190 |
| 2006/0143700 | A1 * | 6/2006 | Herrmann | 726/14 |
| 2006/0277417 | A1 * | 12/2006 | Oikawa et al. | 713/193 |
| 2007/0094509 | A1 * | 4/2007 | Wei et al. | 713/176 |
| 2008/0021901 | A1 * | 1/2008 | Skaria et al. | 707/9 |
| 2008/0065895 | A1 * | 3/2008 | Liu et al. | 713/176 |
| 2008/0069338 | A1 * | 3/2008 | Relyea | 380/28 |
| 2008/0133414 | A1 * | 6/2008 | Qin et al. | 705/50 |
| 2008/0134309 | A1 * | 6/2008 | Qin et al. | 726/6 |
| 2008/0140578 | A1 * | 6/2008 | Felt et al. | 705/71 |
| 2008/0173709 | A1 * | 7/2008 | Ghosh | 235/382 |
| 2008/0189551 | A1 * | 8/2008 | Chang | 713/176 |
| 2009/0271635 | A1 * | 10/2009 | Liu et al. | 713/186 |

OTHER PUBLICATIONS

Microsoft Authenticode; Authenticode, Microsoft Technet Article on Authenticode [online]; Sep. 14, 2008 [retrived on Mar. 19, 2012]; Microsoft Corporation; Retrived from the internet: <URL: http://web.archive.org/web/20080914194634/http://technet.microsoft.com/en-us/library/cc750035.aspx; pp. 1-16.*

(Continued)

*Primary Examiner* — Bradley Holder
(74) *Attorney, Agent, or Firm* — ALG Intellectual Property, LLC (57) ABSTRACT

Computer-implemented methods and systems for using tiered signing certificates to manage the behavior of executables are disclosed. In one example, a method for performing such a task may include: 1) identifying an executable file, 2) identifying a signing certificate associated with the executable file, 3) identifying, within the signing certificate, a privilege level associated with the executable file, and then 4) managing behavior of the executable file in accordance with the privilege level associated with the executable file. Corresponding methods and systems for generating tiered signing certificates for executable files are also disclosed.

10 Claims, 7 Drawing Sheets

(56) References Cited

OTHER PUBLICATIONS

American Bar Association; Digital Signature Guidelines Tutorial [online]; Feb. 10, 2002 [retrived on Mar. 2, 2010]; American Bar Association Section of Science and Technology Information Security Committee; Retrived from the internet: <URL:http://web.archive.org/web/20020210124615/www.abanet.org/scitech/ec/isc/dsg-tutorial.html; pp. 1-8.*

Lindquist; Security considerations for distributed Web-based e-commerce applications in Java; Published in: System Sciences, 2002. HICSS. Proceedings of the 35th Annual Hawaii International Conference on; Date of Conference: Jan. 7-10, 2002; pp. 1-5; IEEE Xplore.*

Yin et al.; Separating agreement from execution for byzantine fault tolerant services; Proceeding SOSP '03 Proceedings of the nineteenth ACM symposium on Operating systems principles; pp. 253-267; 2003; ACM Digital Library.*

"Authenticode"; (accessed on May 14, 2009); Internet Security Systems; http://www.iss.net/security_center/advice/Countermeasures/Authentication/Authenticode/default.htm.

"Signing and Checking Code with Authenticode"; (accessed May 19, 2009); MSDN; Microsoft Corporation; http://msdn.microsoft.com/en-us/library/ms537364(VS.85,printer).aspx.

* cited by examiner

SYSTEMS AND METHODS FOR USING TIERED SIGNING CERTIFICATES TO MANAGE THE BEHAVIOR OF EXECUTABLES

BACKGROUND

Recently, researchers have determined that malicious computer programs ("malware") may be evolving faster than security-software programs can react. In an attempt to address this problem, security-software providers have begun migrating towards various "whitelisting" approaches. In many whitelisting systems, only applications or files that are contained within a defined list may be accessed or executed by a computing system. One of the more deterministic whitelisting approaches requires that executable files be signed by the publisher of the file and/or a trusted certificate authority. In this approach, the whitelisting system may only allow a computing system to access or execute files that can be verified as originating from a publisher that has been authenticated by a trusted certificate authority.

Unfortunately, not all executable files require the same level of privileges in order to perform their intended tasks. For example, some executable files require high-level privileges (such as the ability to open a network connection or inject code into an additional process), while others merely require low-level privileges (such as the ability to execute or access a local file system). Traditional signing techniques, however, fail to account for these varying privilege needs. For example, a conventional signing certificate (issued, for example, by a certificate authority) may grant a publisher all available privileges, even if an executable file generated by the publisher only requires various low-level privileges. Moreover, the vetting process for obtaining signing certificates from certificate authorities is traditionally the same for all publishers, regardless of the purpose or needs of the executable files to be signed by the signing certificate.

SUMMARY

As will be described in greater detail below, the instant disclosure generally relates to systems and methods for using tiered (i.e., privilege-level specific) signing certificates to manage the behavior of executables. In one example, a method for performing such a task may comprise: 1) detecting the loading of an executable file, 2) identifying a signing certificate associated with the executable file, 3) identifying, within the signing certificate, a privilege level that is associated with the executable file (which privilege level may identify, for example, a set of privileges granted to the executable file), and then 4) managing behavior of the executable file in accordance with the privilege level associated with the executable file.

The system may manage the behavior of the executable file in accordance with its associated privilege level by, for example, preventing the executable file from performing privileged operations that exceed its associated privilege level while allowing the executable file to perform privileged operations that do not exceed its associated privilege level. In some examples, the method may also comprise identifying and then validating a digital signature provided by the publisher of the executable file.

The present application also discloses systems and methods for generating tiered signing certificates for publishers of executable files. In one example, a method for performing such a task may comprise: 1) receiving, at a server maintained by a certificate authority, a request for a signing certificate for a publisher of executable files, 2) analyzing information within the request that identifies both the publisher and a desired privilege level (i.e., a list of desired privileges) for the publisher, 3) determining, based at least in part on the information contained within the request, a privilege level to assign to the publisher, 4) generating a signing certificate for the publisher that contains the privilege level assigned to the publisher, and then 5) providing the signing certificate to the publisher.

Because the privileges required by publishers vary, in some examples the system may determine what privilege level to assign to the publisher by: 1) obtaining, either from the publisher itself or from other sources, and then analyzing additional information regarding the publisher (such as the size of the publisher, the annual revenues of the publisher, the number of files of the publisher that are in circulation, etc.), 2) obtaining and then analyzing information from the publisher regarding executable files that are published by the publisher (e.g., information that may be used to determine the nature and purpose of files published by the publisher in order to determine why such files require the set of privileges requested by the publisher), 3) and/or requesting additional or increased certification fees from the publisher.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using tiered signing certificates to manage the behavior of executables. The terms "executable," "executable file," and "binary," as used herein, generally refer to files that contain computer-readable instructions that may cause a computing device to perform one or more tasks. Examples of executable file formats include, without limitation, EXE, ELF, MACH-O, universal binaries, fat binaries, or the like.

Figure 1:
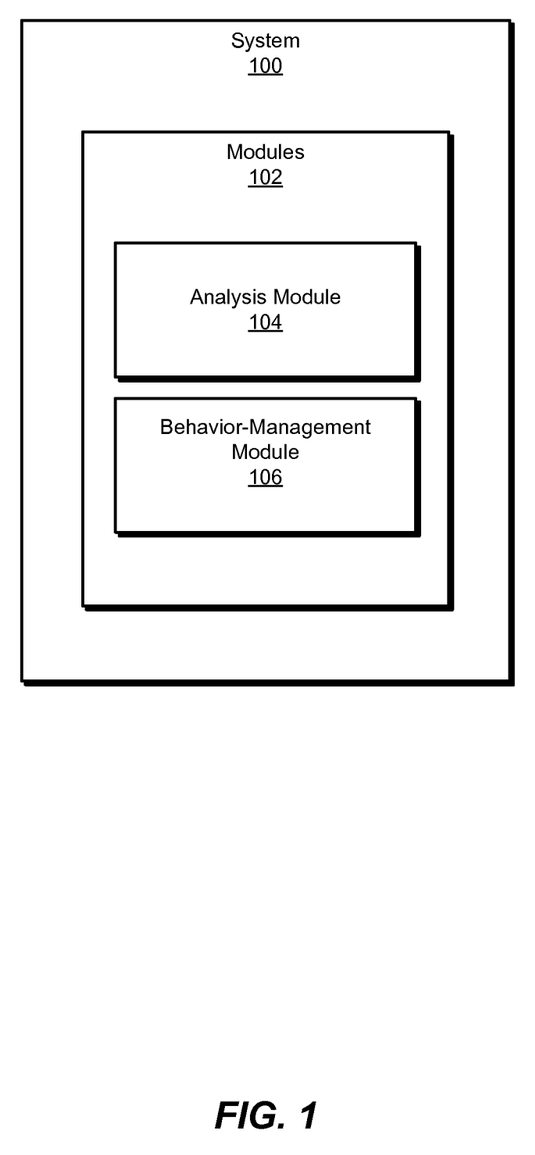
FIG. 1 is a block diagram of an exemplary system for using tiered signing certificates to manage the behavior of executables according to at least one embodiment.
Figure 2:
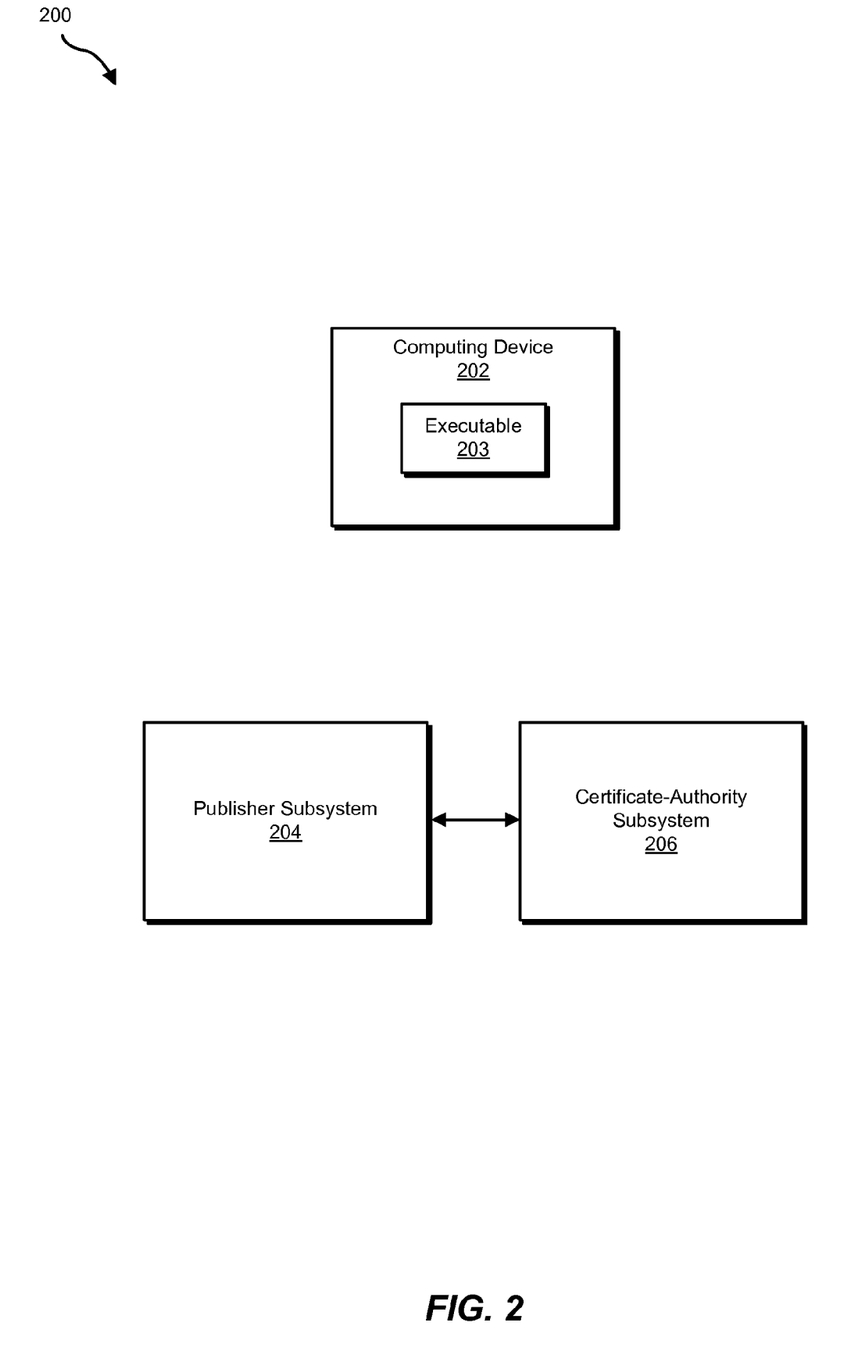
FIG. 2 is a block diagram of an exemplary system for using tiered signing certificates to manage the behavior of executables according to an additional embodiment.

The following will provide, with reference to FIGS. 1-2, detailed descriptions of exemplary systems for using tiered signing certificates to manage the behavior of executables. Detailed descriptions of corresponding computer-implemented methods will be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for using tiered signing certificates to manage the behavior of executables. As illustrated in this figure, exemplary system 100 may comprise one or more modules for performing one or more tasks. For example, and as will be explained in greater detail below, exemplary system 100 may comprise an analysis module 104 programmed to identify, by inspecting a signing certificate associated with an executable file, a privilege level associated with the executable file. Exemplary system 100 may also comprise a behavior-management module 106 programmed to manage the behavior of the executable file in accordance with the privilege level associated with the executable file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202, publisher subsystem 204, and/or certificate-authority subsystem 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 4:
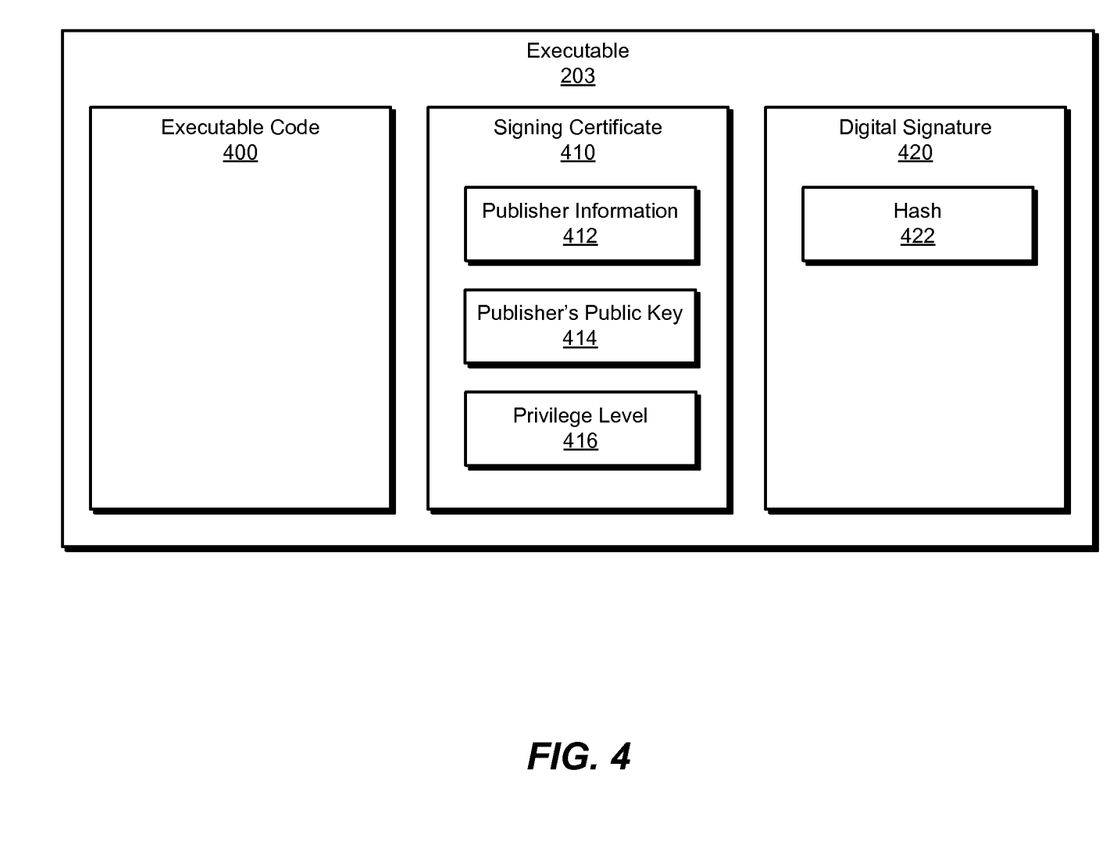
FIG. 4 is an illustration of an exemplary executable file.

FIG. 2 is a block diagram of an exemplary system 200 for using tiered signing certificates to manage the behavior of executables. As illustrated in this figure, exemplary system 200 may comprise a computing device 202. As will be explained in greater detail below, in one embodiment modules (such as analysis module 104 and behavior-management module 106 in FIG. 1) on computing device 202 may: 1) identify an executable file 203 on computing device 202, 2) identify a signing certificate associated with executable file 203, 3) identify, within the signing certificate, a privilege level associated with executable file 203, and then 4) manage behavior of executable file 203 in accordance with its associated privilege level. In one example, and as illustrated in FIG. 4, executable file 203 may represent a digital package comprising executable code 400, a signing certificate 410, and a digital signature 420.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

As illustrated in FIG. 2, exemplary system 200 may also comprise a publisher subsystem 204 in communication with a certificate-authority subsystem 206. As will be explained in greater detail below, in one embodiment certificate-authority subsystem 206 may: 1) receive a request from publisher subsystem 204 (maintained, for example, by a software publisher) for a signing certificate for the publisher, the request containing information that identifies at least the publisher and a desired privilege level for the publisher, 2) determine, based at least in part on the request, a privilege level for the publisher, and then 3) generate a signing certificate for the publisher that identifies the privilege level assigned to the publisher. In one example, by causing publisher subsystem to receive and store this signing certificate, certificate-authority subsystem 206 may transform at least one property or characteristic of publisher subsystem 204 (e.g., a property or characteristic of a storage device on publisher system 204).

Certificate-authority subsystem 206 generally represents any type or form of computing device that is capable of generating tiered signing certificates. Examples of certificate-authority subsystem 206 include, without limitation, servers, exemplary computing system 610 in FIG. 6, and portions of exemplary network architecture 700 in FIG. 7. Similarly, publisher subsystem 204 generally represents any type or form of computing device capable of reading or executing computer-executable instructions.

Figure 3:
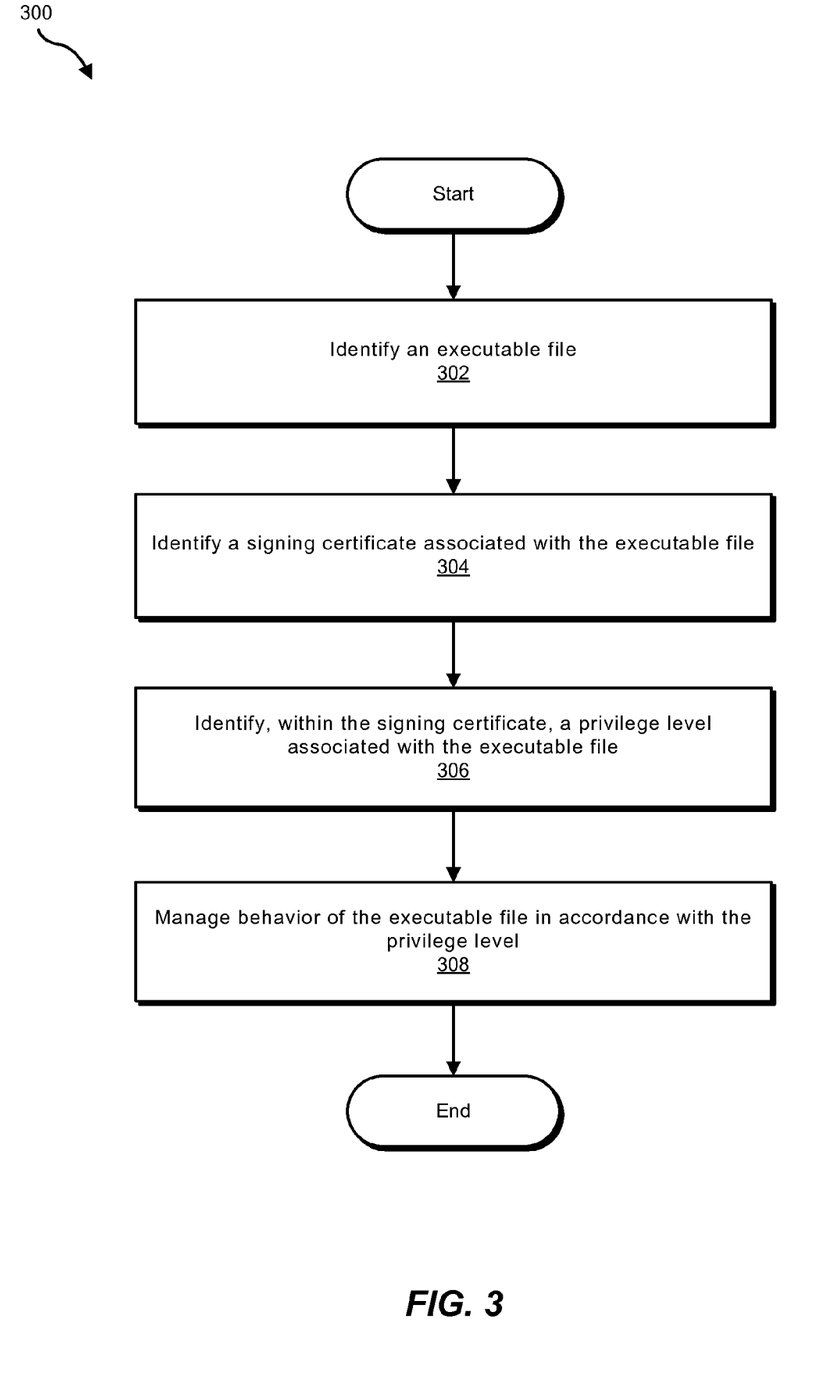
FIG. 3 is a flow diagram of an exemplary method for using tiered signing certificates to manage the behavior of executables.

FIG. 3 is a flow diagram of an exemplary computer-implemented method 300 for using tiered signing certificates to manage the behavior of executables. As illustrated in this figure, at step 302 the system may identify an executable file. For example, analysis module 104 in FIG. 1 (which may, as detailed above, be stored and configured to run on computing device 202 in FIG. 2) may identify executable file 203 on computing device 202.

The system may perform step 302 in a variety of ways. In one example, the system may identify executable file 203 when executable file 203 is loaded or executed on computing device 202. In other examples, the system may identify executable file 203 when the system detects an attempt to load or execute executable file 203 on computing device 202. The system may also identify executable file 203 when executable file 203 is downloaded or otherwise loaded onto computing device 202.

At step 304, the system may identify a signing certificate associated with the executable file identified in step 302. For example, analysis module 104 in FIG. 1 (which may, as detailed above, be stored and configured to run on computing device 202 in FIG. 2) may identify a signing certificate (such as signing certificate 410 in FIG. 4) that is associated with executable file 203 in FIG. 2.

The phrase "signing certificate," as used herein, generally refers to an electronic document issued by a certificate authority that attests that a public cryptographic key belongs to an identified entity. Signing certificates may be produced in a variety of forms. For example, as illustrated in FIG. 4, an exemplary signing certificate 410 may comprise publisher information 412 that identifies a publisher of the executable file (in this example, executable file 203), a public key 414 provided by a publisher of executable file 203, and a privilege level 416 associated with executable file 203 by a certificate authority, as will be described in greater detail below. In one example, and as will be described in greater detail below, signing certificate 410 may be created by a certificate authority by signing (i.e., encrypting) publisher information 412, public key 414, and privilege level 416 using the certificate authority's private key.

In one example, signing certificate 410 in FIG. 4 may be packaged with executable code 400 and digital signature 420 as executable file 203. In other examples, signing certificate 410 and/or digital signature 420 may be packaged as separate and/or distinct files.

Returning to FIG. 3, at step 306 the system may identify, within the signing certificate, a privilege level that is associated with the executable file. For example, analysis module 104 in FIG. 1 (which may, as detailed above, be stored and programmed to run on computing device 202 in FIG. 2) may detect privilege level 416 within signing certificate 410 in FIG. 4.

The phrase "privilege level," as used herein, may refer to a set of privileges that are associated with (i.e., privileged operations that may be performed by) an executable file and/or a publisher of the executable file. In one example, this privilege level may be assigned to the executable file and/or the publisher of the executable file by a certificate authority, as will be described in greater detail below. For example, a certificate authority may assign a privilege level to a publisher in a signing certificate, and the publisher may in turn distribute this signing certificate with an executable. Examples of privileges that may be granted or assigned include, without limitation, the ability to execute, the ability to read or write to a local file system, the ability to open a network connection, the ability to perform system calls, the ability to inject computer-readable instructions into separate processes, and the ability to perform any other privileged operation.

The system may perform step 306 in a variety of ways. In one example, the system may identify the privilege level within the signing certificate by decrypting the signing certificate using a public key provided by the certificate authority that generated the signing certificate. In this example, decrypting the signing certificate may produce: 1) information that identifies a publisher of the executable file (e.g., publisher information 412 in FIG. 4), 2) a public key provided by the publisher of the executable file (e.g., public key 414), and 3) a privilege level assigned by the certificate authority (e.g., privilege level 416).

Although not illustrated in FIG. 3, in some examples exemplary step 306 may also comprise: 1) identifying a digital signature provided by the publisher of the executable file and then 2) validating this digital signature. For example, analysis module 104 in FIG. 1 (which may, as detailed above, be stored and programmed to run on computing device 202 in FIG. 2) may identify and validate a digital signature 420 in FIG. 4 provided by a publisher of executable file 203. Analysis module 104 may then validate digital signature 420 to verify that executable file 203 has not been modified or tampered with since it was created by its publisher. Digital signature 420 generally represents any type or form of electronic document that may be used to verify the authenticity of an executable file. In one example, digital signature 420 may be generated by a publisher of executable file 203 by generating a hash 422 of executable file 203 and then electronically signing (i.e., encrypting) hash 422 using the publisher's private key.

The system may validate the digital signature in a variety of ways. In one example, analysis module 104 in FIG. 1 may validate digital signature 420 in FIG. 4 by: 1) calculating a hash of executable file 203, 2) decrypting, using the public key 414 provided by the publisher of executable file 203, digital signature 420 to obtain an expected hash 422 of executable file 203, and then 3) determining that the calculated hash matches expected hash 422. Validating the digital signature in this manner may verify that executable file 203 has not been modified or tampered with since it was created by its publisher.

Returning to FIG. 3, at step 308 the system may manage the behavior of the executable file in accordance with the privilege level contained within the signing certificate. For example, behavior-management module 106 in FIG. 1 (which may, as detailed above, be stored and configured to run on computing device 202 in FIG. 2) may manage the behavior of executable file 203 on computing device 202 in accordance with privilege level 416 contained in signing certificate 410 in FIG. 4. Upon completion of step 308, exemplary method 300 in FIG. 3 may terminate.

The system may manage the behavior of executable files in a variety of ways. In one example, the system may manage the behavior of an executable file in accordance with its privilege level by preventing the executable file from performing operations that exceed the privilege level associated with the executable file while allowing the executable file to perform operations that do not exceed (i.e., privileged operations that are less than or equal to) the privilege level associated with the executable file.

For example, if privilege level 416 in FIG. 4 indicates that executable file 203 may be allowed to execute and perform read and write operations on a local file system on computing device 202, then, if behavior-management module 106 in FIG. 1 detects an attempt by executable file 203 to open a network connection on computing device 202 or perform some other privileged operation that exceeds the set of privileges associated with executable file 203 in privilege level 416, then behavior-management module 106 may prevent executable file 203 from performing the attempted operation. Alternatively, if privilege level 416 indicates that executable file 203 may be allowed to: 1) execute, 2) perform read and write operations on a local file system on computing device 202, and 3) open network connections on computing device 202, then, if behavior-management module 106 detects an attempt by executable file 203 to open a network connection on computing device 202, behavior-management module 106 may allow executable file 203 to perform this operation.

Figure 5:
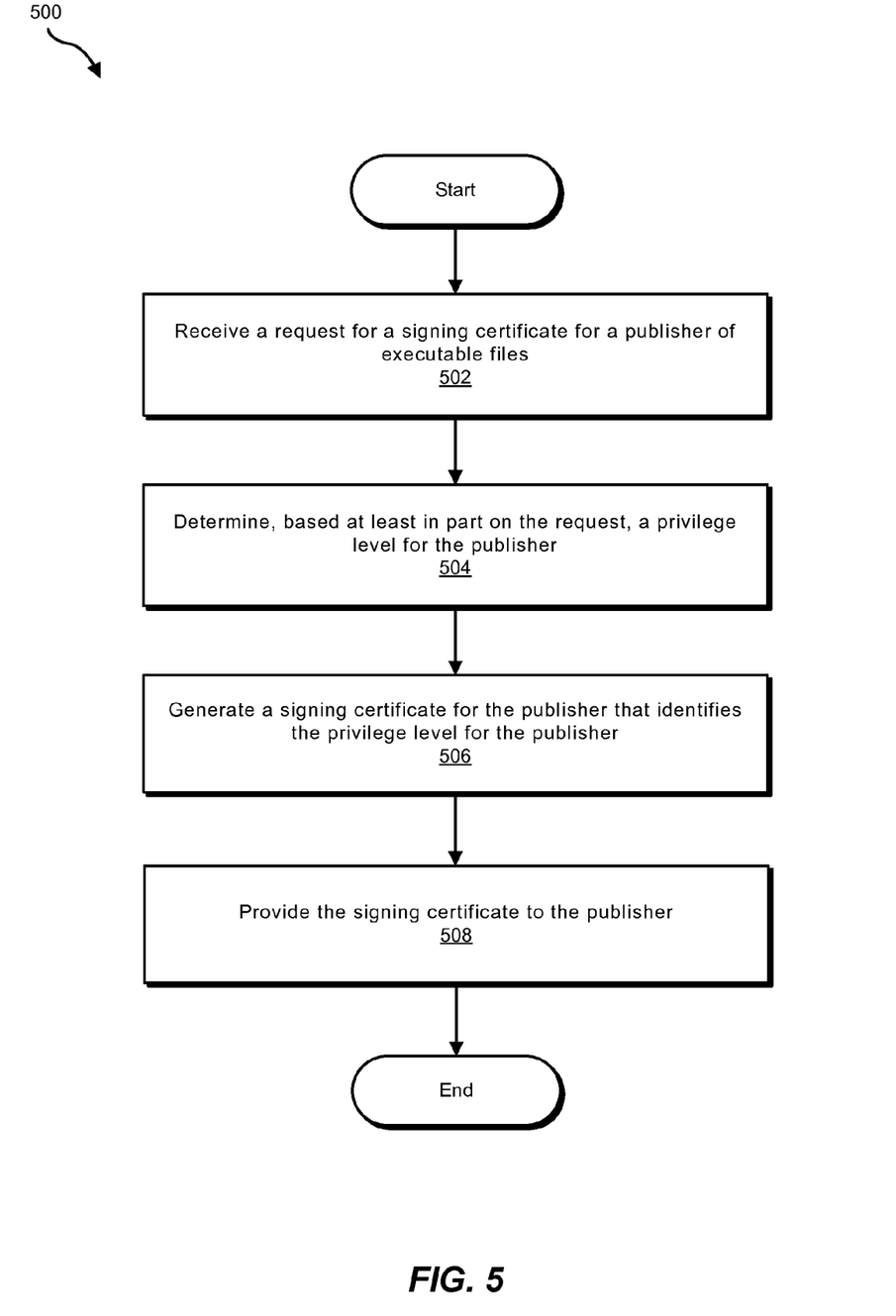
FIG. 5 is a flow diagram of an exemplary method for generating tiered signing certificates.

As detailed above, the instant disclosure also identifies systems and methods for generating tiered (i.e., privilege-level specific) signing certificates or executable files. FIG. 5 is a flow diagram of an exemplary computer-implemented method 500 for performing such a task. As illustrated in this figure, at step 502 the system may receive a request for a signing certificate for a publisher of executable files. For example, certificate-authority subsystem 206 in FIG. 2 may receive a request from publisher subsystem 204 (which may, as detailed above, be maintained by a software publisher) for a signing certificate.

In one example, the request received in step 502 may contain information that identifies both the publisher and a desired privilege level (e.g., a list of desired privileges) for the publisher. Information that may be used to identify the publisher may include, without limitation, the publisher's name (e.g., the name of an individual or organization), the publisher's country of origin, or the like. In some examples, the request may also contain a copy of the publisher's public key (e.g., public key 414 in FIG. 4).

At step 504, the system may determine, based at least in part on information contained within the request received in step 502, a privilege level to assign to the publisher identified in the request.

The system may perform step 504 in a variety of ways. In one example, if the list of desired privileges contained within the request received in step 502 represent high-level privileges (such as the ability to inject code into separate processes, open network connections, or the like), then the system may: 1) request, either from the publisher or from an additional source, additional information regarding the identity of the publisher (i.e., information that may be used to authenticate the publisher, such as information that may be used identify the size of the publisher, how long the publisher has been in operation, annual revenues of the publisher, the number of applications or files of the publisher that are in circulation, whether the publisher has been known to generate malware, or the like), 2) request information regarding executable files published by the publisher (e.g., information that may be used to determine the nature and purpose of files published by the publisher in order to determine why such files require the requested set of privileges), 3) request an increased certification fee from the publisher, or 4) otherwise attempt to determine whether to grant the publisher the requested set of privileges.

At step 506, the system may generate a signing certificate for the publisher that identifies the privilege level assigned to the publisher. For example, certificate-authority subsystem 206 in FIG. 2 may generate a signing certificate 410 in FIG. 4 that contains a privilege level 416 assigned to the publisher.

The system may generate signing certificates in a variety of ways. In one example, the system may generate a signing certificate for a publisher by encrypting, using a certificate authority's private key, a package that contains: 1) information that identifies the publisher (e.g., the name of the publisher, the address of the publisher, or the like), 2) a public key provided by the publisher, and 3) a privilege level assigned to the publisher (i.e., a set of privileged operations that may be performed by executable files published by the publisher).

At step 508, the system may provide the signing certificate to the publisher. For example, certificate-authority subsystem 206 in FIG. 2 may transmit signing certificate 410 in FIG. 4 to publisher subsystem 204 in FIG. 2. Upon completion of step 508, exemplary method 508 in FIG. 5 may terminate.

As detailed above, the systems and methods disclosed herein may, through the use of tiered signing certificates, manage or regulate the behavior of executable files. As such, the systems and methods disclosed herein may provide a higher level of control and flexibility to certificate authorities and security-software providers, which may in turn result in a more accurate and secure whitelisting security approach.

Figure 6:
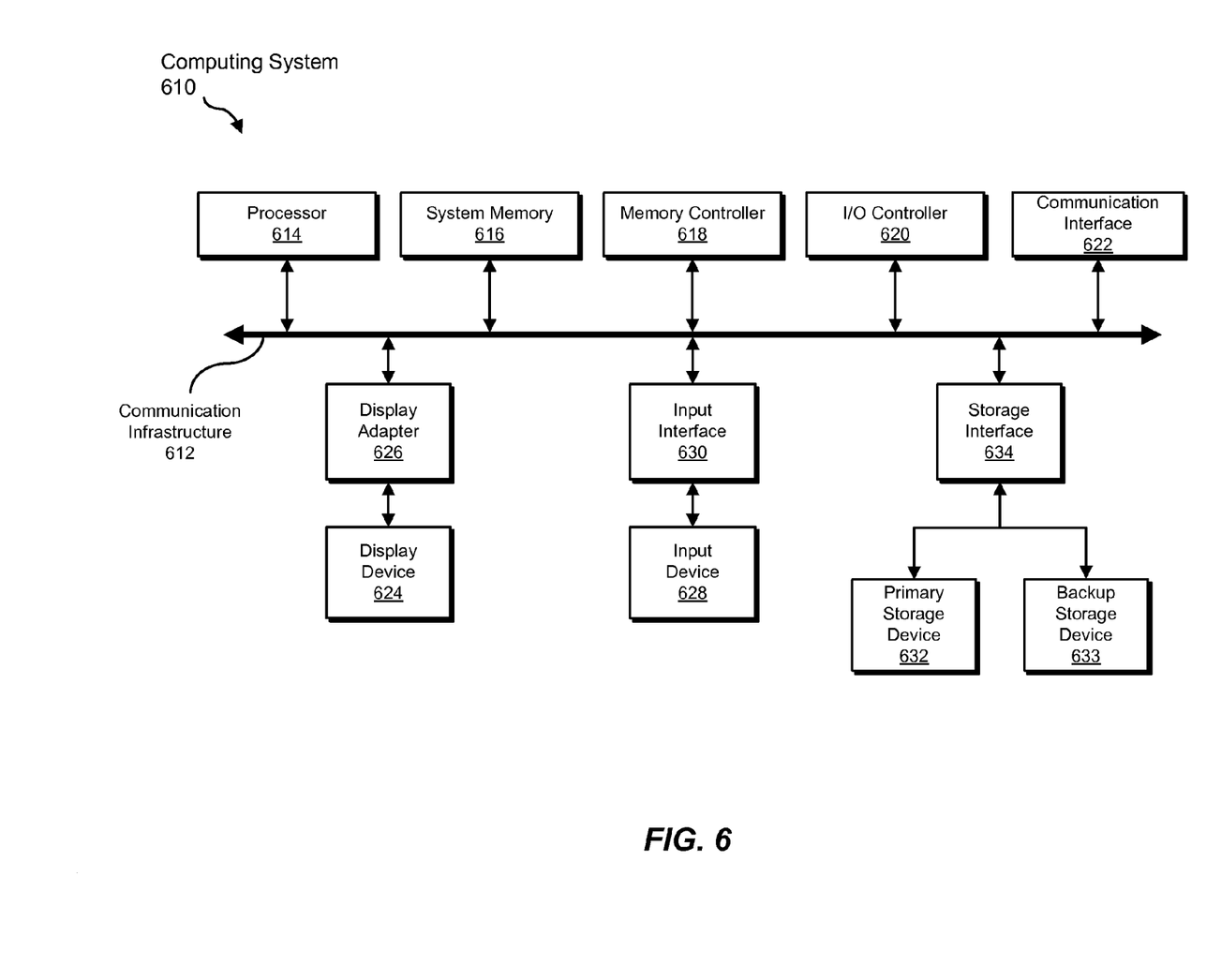
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, managing, preventing, allowing, decrypting, encrypting, validating, calculating, determining, detecting, receiving, generating, authenticating, and obtaining steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, managing, preventing, allowing, decrypting, encrypting, validating, calculating, determining, detecting, receiving, generating, authenticating, and obtaining.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, managing, preventing, allowing, decrypting, encrypting, validating, calculating, determining, detecting, receiving, generating, authenticating, and obtaining steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, managing, preventing, allowing, decrypting, encrypting, validating, calculating, determining, detecting, receiving, generating, authenticating, and obtaining steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, managing, preventing, allowing, decrypting, encrypting, validating, calculating, determining, detecting, receiving, generating, authenticating, and obtaining steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, managing, preventing, allowing, decrypting, encrypting, validating, calculating, determining, detecting, receiving, generating, authenticating, and obtaining steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
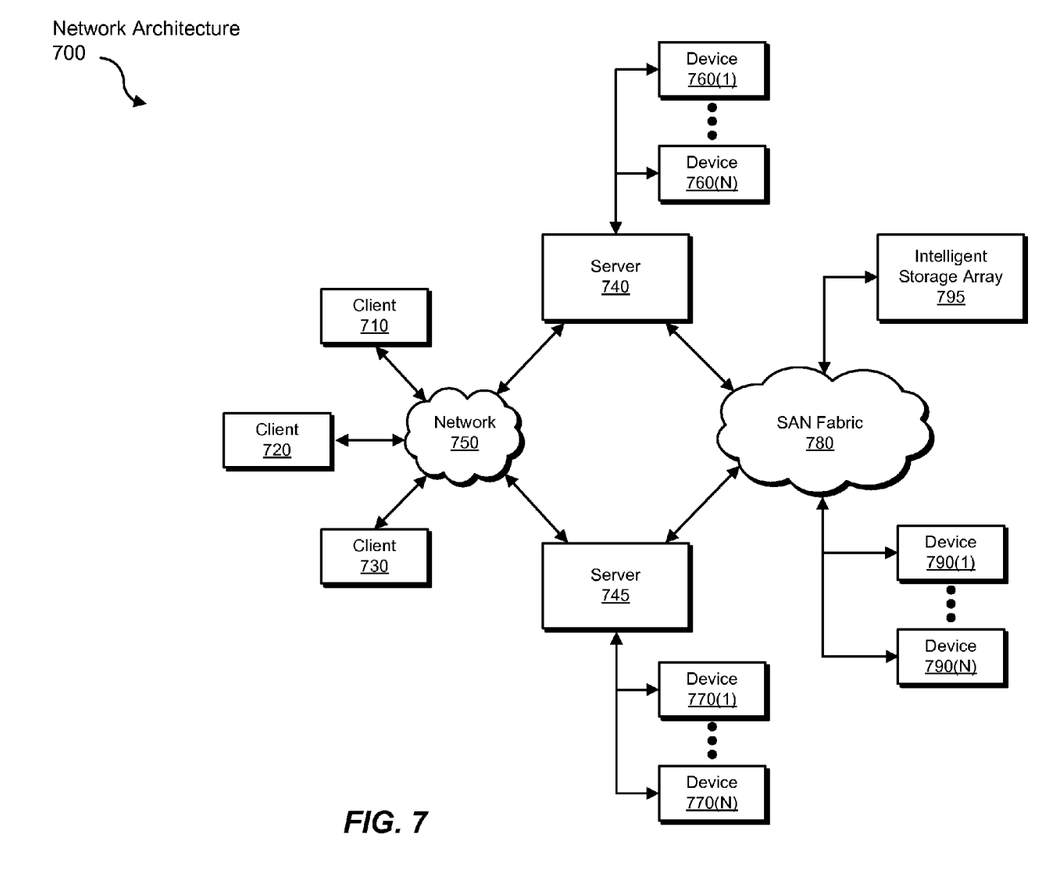
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing one or more of the steps disclosed herein, such as identifying, managing, preventing, allowing, decrypting, encrypting, validating, calculating, determining, detecting, receiving, generating, authenticating, and obtaining. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for using tiered signing certificates to manage the behavior of executables that comprises: 1) identifying an executable file, 2) identifying a signing certificate associated with the executable file, 3) identifying, within the signing certificate, a privilege level associated with the executable file, and then 4) managing behavior of the executable file in accordance with the privilege level associated with the executable file.

In one example, managing the behavior of the executable file in accordance with the privilege level associated with the executable file may comprise: 1) preventing the executable file from performing operations that exceed the privilege level associated with the executable file and 2) allowing the executable file to perform operations that do not exceed the privilege level associated with the executable file. In some examples, the operations may comprise privileged operations and the privilege level may identify a set of such privileged operations associated with the executable file.

In one embodiment, identifying the privilege level within the signing certificate may comprise decrypting, using a public key provided by a certificate authority, the signing certificate to obtain: 1) information that identifies a publisher of the executable file, 2) a public key provided by the publisher of the executable file, and 3) the privilege level associated with the executable file. The method may also comprise identifying and then validating a digital signature provided by the publisher of the executable file. In some examples, validating the digital signature may comprise: 1) calculating a hash of the executable file, 2) decrypting, using the public key provided by the publisher of the executable file, the digital signature to obtain an expected hash of the executable file, and then 3) determining that the calculated hash matches the expected hash. In addition, identifying the executable file may comprise detecting an attempt to execute the executable file.

In addition, a computer-implemented method for generating privilege-level specific signing certificates for publishers of executable files may comprise: 1) receiving, at a server maintained by a certificate authority, a request for a signing certificate for a publisher of executable files (the request comprising at least information that identifies the publisher and information that identifies a desired privilege level for the publisher, 2) determining, based at least in part on the request, a privilege level for the publisher, 3) generating a signing certificate for the publisher that identifies the privilege level for the publisher, and then 4) providing the signing certificate to the publisher.

The method may also comprise authenticating the publisher by, for example, obtaining additional information regarding the publisher, receiving information regarding executable files published by the publisher, and/or receiving a certification fee from the publisher. In this example, determining the privilege level for the publisher may comprise determining the privilege level based on the additional information regarding the publisher, the information regarding the executable files published by the publisher, and/or the certification fee.

In some examples, the request may further comprise a public key provided by the publisher. In these examples, generating the signing certificate may comprise encrypting, using a private key of the certificate authority, a package that comprises: 1) information that identifies the publisher, 2) the public key provided by the publisher, and 3) the privilege level.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using tiered signing certificates to manage the behavior of executables, the method comprising:

identifying, at a computing device that comprises at least one hardware processor, an executable file;

identifying, at the computing device, a signing certificate associated with the executable file;

decrypting, at the computing device using a public key provided by a certificate authority, the signing certificate associated with the executable file to obtain a privilege level assigned to the executable file by the certificate authority that identifies at least one privileged operation that the executable file is allowed to perform on the computing device;

managing, at the computing device, privileged operations performed on the computing device by the executable file in accordance with the privilege level assigned to the executable file by the certificate authority by:

preventing the executable file from performing privileged operations that exceed the privilege level assigned to the executable file by the certificate authority;

allowing the executable file to perform privileged operations that do not exceed the privilege level assigned to the executable file by the certificate authority.

2. The method of claim 1, wherein the privilege level assigned to the executable file by the certificate authority identifies a set of privileged operations that the executable file is allowed to perform on the computing device.

3. The method of claim 1, further comprising decrypting, using the public key provided by the certificate authority, the signing certificate to obtain at least one of:

information that identifies a publisher of the executable file;

a public key provided by the publisher of the executable file.

4. The method of claim 3, further comprising:

identifying a digital signature provided by the publisher of the executable file;

validating the digital signature.

5. The method of claim 4, wherein validating the digital signature comprises:

calculating a hash of the executable file;

decrypting, using the public key provided by the publisher of the executable file, the digital signature to obtain an expected hash of the executable file;

determining that the calculated hash matches the expected hash.

6. The method of claim 1, wherein identifying the executable file comprises detecting an attempt to execute the executable file on the computing device.

7. A system for using tiered signing certificates to manage the behavior of executables, the system comprising:

an analysis module, installed on a computing device that comprises at least one hardware processor, that, when executed by the processor:

identifies an executable file;

identifies a signing certificate associated with the executable file;

decrypts, using a public key provided by a certificate authority, the signing certificate associated with the executable file to obtain a privilege level assigned to the executable file by the certificate authority that identifies at least one privileged operation that the executable file is allowed to perform on the computing device;

a behavior-management module, installed on the computing device, that, when executed by the processor, manages privileged operations performed on the computing device by the executable file in accordance with the privilege level assigned to the executable file by the certificate authority by:

preventing the executable file from performing privileged operations that exceed the privilege level assigned to the executable file by the certificate authority;

allowing the executable file to perform privileged operations that do not exceed the privilege level assigned to the executable file by the certificate authority.

8. The system of claim 7, wherein the privilege level assigned to the executable file by the certificate authority identifies a set of privileged operations that the executable file is allowed to perform on the computing device.

9. The system of claim 7, wherein the analysis module, when executed by the processor, decrypts, using the public key provided by the certificate authority, the signing certificate to obtain at least one of:

information that identifies a publisher of the executable file;

a public key provided by the publisher of the executable file.

10. The system of claim 9, wherein the analysis module, when executed by the processor:

identifies a digital signature provided by the publisher of the executable file;

validates the digital signature.

\* \* \* \* \*